US000001180H

United States Statutory Invention Registration [19]

[11] Reg. Number: H1180

[43] Published: May 4, 1993

Arianoutsos et al.

[54] FACE SEAL WITH INCREASED TORQUE TRANSFER CAPACITY

[75] Inventors: Steve L. Arianoutsos, Peoria Heights; Alan P. Dremann, Chillicothe; Jerry A. Metz, Morton; Harry B. Newman, Washington, all of Ill.

[73] Assignee: Caterpillar Inc., Peoria, Ill.

[21] Appl. No.: 812,494

[22] Filed: Dec. 23, 1991

[51] Int. Cl.[5] ..... F16J 15/34

[52] U.S. Cl. ..... 277/92; 277/81 R

[58] Field of Search ..... 277/92, 84, 37, 136, 277/165; 285/917, 918

[56] References Cited

U.S. PATENT DOCUMENTS

| | | | |
|---|---|---|---|
| 1,848,307 | 3/1932 | Boynton | 285/917 X |
| 2,016,228 | 10/1935 | Clausen | 285/917 X |
| 3,390,922 | 7/1968 | Reinsma | 305/11 |
| 3,467,448 | 9/1969 | Galle | 277/165 X |
| 4,094,516 | 6/1978 | Morley et al. | 277/92 |
| 4,195,852 | 4/1980 | Roley et al. | 277/92 |
| 4,204,716 | 5/1980 | Baylor | 277/92 X |
| 4,262,914 | 4/1981 | Roley | 277/84 |
| 4,819,999 | 5/1989 | Livesay et al. | 277/92 |
| 4,856,794 | 8/1989 | Boyers et al. | 277/136 X |
| 5,018,753 | 5/1991 | Porel | 277/136 X |

*Primary Examiner*—Bernarr E. Gregory

*Attorney, Agent, or Firm*—O. Gordon Pence

[57] ABSTRACT

A shear loaded face seal having means for increasing the torque transfer capacity of the shear loaded face seal between its support ring and its load ring along their mating interface is disclosed. In such a shear loaded face seal, the load ring is of a deformable rubber and the support ring is rigid. A varying torque is transmitted through the shear loaded face seal along the interface between the load ring and the seal ring. The torque transfer means comprises a surface texture on the mating surfaces of the support ring that has a configuration sufficient to generate a projected area that is at least five per cent of the surface area of a non-textured surface of equivalent dimensions. The surface texture is provided by a plurality of uniformly spaced micro splines that are oriented normal to the direction of the torque.

13 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FACE SEAL WITH INCREASED TORQUE TRANSFER CAPACITY

DESCRIPTION

1. Technical Field

This invention relates generally to a shear loaded face seal for use in severe applications such as in the hinge joints of earthmoving vehicles and the like and, more particularly, to an improved seal with greater torque transfer capacity.

2. Background Art

Shear loaded face seals used in the hinge joints of earthmoving vehicles are exposed to the extreme conditions imposed by the elements. In hinge joint applications such as the joints of endless track chain used to propel track-type tractors or the loader linkage joints of loader-type vehicles, shear loaded face seals must be capable of sealing lubricant in the joint and sealing moisture, dirt and other abrasive matter out of the joint. Shear loaded face seals presently used in track are of the type disclosed in U.S. Pat. No. 4,195,852, issued Apr. 1, 1980 to Robert D. Roley et al., or in U.S. Pat. No. 4,262,914, issued Apr. 21, 1981 to Robert D. Roley, both of which are assigned to the assignee hereof. In a typical track joint application, the shear loaded face seal is located in a seal cavity disposed about the track pin. The cavity is typically provided by a counterbore in an outboard end collar of one of the links of the track chain and the adjacent end of a track bushing secured to an adjoining link of such chain. During track articulation, the outboard end collar rotates relative to the track bushing. The typical shear loaded face seal is a three part seal comprising a rubber load ring, a rigid support ring and a plastic seal lip. In practice, the seal lip is permanently affixed to the support ring so that these two components form a unitary member. Such unitary member is referred to herein as the "seal ring". The seal ring is placed against the radial end face of the bushing where dynamic sealing is designed to occur. The rubber load ring provides an axial force for urging a seal ring into sealing engagement against such end face. While rotational movement between the seal ring and the bushing end face is a design requirement, no such movement is intended, nor desired, between either the seal (as a unit) and link end collar or between the load ring and the seal ring. However, things do not always work as intended. In fact, slippage between the load ring and seal ring has become a problem in prior track seals. This slippage or spinning can cause an extreme amount of wear on the load ring in particular, which has resulted in early seal failure.

DISCLOSURE OF THE INVENTION

In accordance with one aspect to the present invention, means are provided for increasing the torque transfer capacity between the load ring and support ring of a shear loaded face seal along a mating interface through which a varying torque is transmitted. In such a shear loaded face seal, the load ring is of a deformable rubber and the support ring is rigid. The torque transfer means comprises a surface texture on the mating surfaces of the support ring that has a configuration sufficient to generate a projected area that is at least five per cent of the surface area of a non-textured surface of equivalent dimensions.

In another aspect of the present invention, the surface texture is provided by a plurality of uniformly spaced micro splines that are oriented normal to the direction of the torque.

BEST MODE FOR CARRYING OUT THE INVENTION

Figure 1:
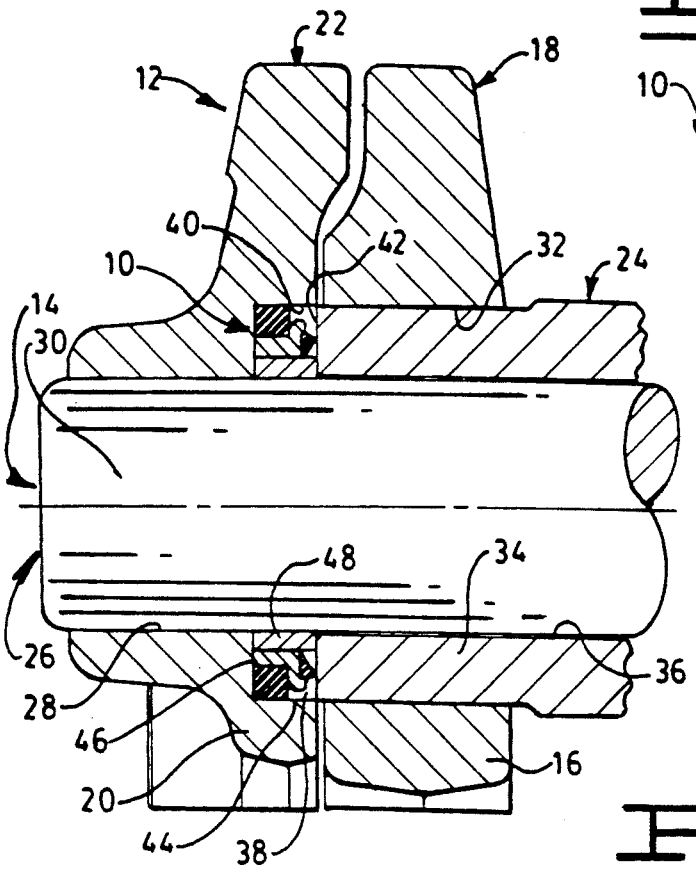
FIG. 1 is fragmentary cross-sectional view of a track joint illustrating a shear loaded face seal embodying the principles of the present invention.

A shear loaded face seal embodying the principles of the present invention is generally depicted by reference numeral 10. In FIG. 1, shear loaded face seal 10 is shown, for illustrative purposes only, in an endless track chain 12 for a track type vehicle (not shown). Such track chain 12 includes a plurality of track joints, one of which is partially depicted at 14 in FIG. 1. In the partial depiction of FIG. 1, the track joint 14 includes an inboard end collar 16 of a first link 18, an outboard end collar 20 of a second link 22, a bushing 24, and a pin 26. The outboard end collar 20 has a pin bore 28 into which an end portion 30 of the pin 26 is nonrotatably secured by means of a heavy press fit. The inboard end collar 16 has a bushing bore 32 into which an end portion 34 of the bushing 24 is nonrotatably secured by a similar heavy press fit. The bushing 24 has a pin bore 36 of a size to freely rotatably mount the pin 26 therewithin.

The seal 10 of the present invention is disposed about the pin 26 within a seal cavity 38 defined by a counterbore 40 and a radial end face 42 of the bushing 24. The counterbore 40 is located at the inboard end of the pin bore 28 and has a cylindrical surface 44 and a radial surface 46. The joint 14 further includes a thrust ring 48 which is disposed radially inboard of the seal 10 to set the minimum axial length of the seal cavity 38 between the radial surface 46 of the counterbore 40 and the bushing end face 42 and to prevent the seal 10 from being crushed during assembly of the joint 14 or during operation of the track chain 12. It should be noted that the portion of the track joint 14 depicted in FIG. 1 is, in essence, only the left hand half of the track joint, it being understood that such joint the track joint, it being understood that such joint 14 also includes a right hand half which is not shown, but is the mirror image of the left hand half. It should also be understood that the construction of the track joint 14 shown and described herein is merely by way of illustration and that the present invention is not intended to be limited thereby, as the seal 10 hereinafter described may be equally employed in any oscillating hinge joint found on earth-moving vehicles.

Figure 2:
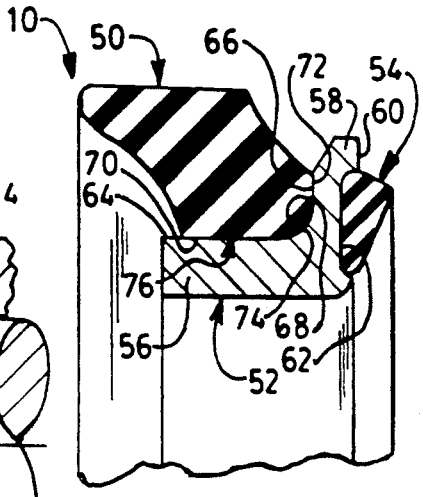
FIG. 2 is an enlarged fragmentary cross-sectional view of the shear loaded face seal shown in FIG. 1 by itself and in a free or unloaded state.
Figure 3:
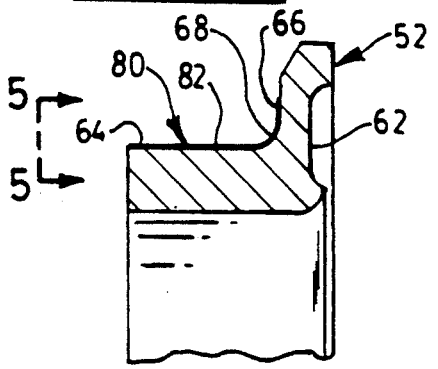
FIG. 3 is a view similar to FIG. 2, but showing the support ring of the seal of FIG. 2 by itself.

As shown in FIG. 2, the seal 10 includes three components of different materials. The first component is a load ring 50 which is made of a soft, deformable rubber having a hardness within a range of from 50 to 70 Shore A durometer, with a 60 Shore A durometer being preferred. Also, the load ring 50 is preferably constructed of an oil resistant synthetic rubber, such as a nitrile rubber or a rubber made of epichlorohydrin.

The second component is a support or stiffener ring 52, which may be made of any rigid material having a minimum flexural modulus of one million p.s.i. Preferably, a hard reinforced thermoplastic, such as glass filled polycarbonate, is used to make the support ring 52.

The third component is a seal lip 54 which is preferably of a polyurethane material.

The support ring 52 is disposed about a central axis 55 (FIG. 4) and has a cylindrical portion 56 and a radial flange portion 58 extending outwardly from one end of the cylindrical portion 56, providing the support ring 52 with a generally L-shaped cross sectional configuration. The flange portion 58 has an outer surface 60 which is preferably provided with a groove 62 for receiving the seal lip 54. In practice, the seal lip 54 is preferably bonded to the flange portion 58 so that the support ring 52 and seal lip 54 become a unitary member, i.e., the seal ring referred to earlier. The support ring 52 also includes an outer cylindrical surface 64 on the cylindrical portion 56 and an inner radial surface 66 on the flange portion 58. The outer cylindrical surface 64 and the radial surface 66 are joined by a radiused corner surface 68.

The load ring 50 has an inner cylindrical surface 70 and a radial surface 72 which are joined by a rounded corner 74. The inner cylindrical surface 70, the radial surface 72, and the rounded corner 74 of the load ring 50 mate with and contact the corresponding outer cylindrical surface 64, the radial surface 66, and the radiused corner surface 68, respectively, of the support ring 52 along an interface 76 therebetween when the load ring is mounted upon the support ring 52.

Figure 4:
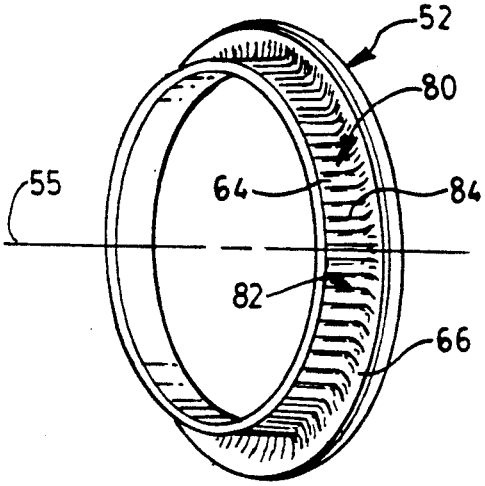
FIG. 4 is an isometric view of the entire support ring shown in FIG. 3. and showing the torque increasing splines of the present invention illustrated thereon.
Figure 5:
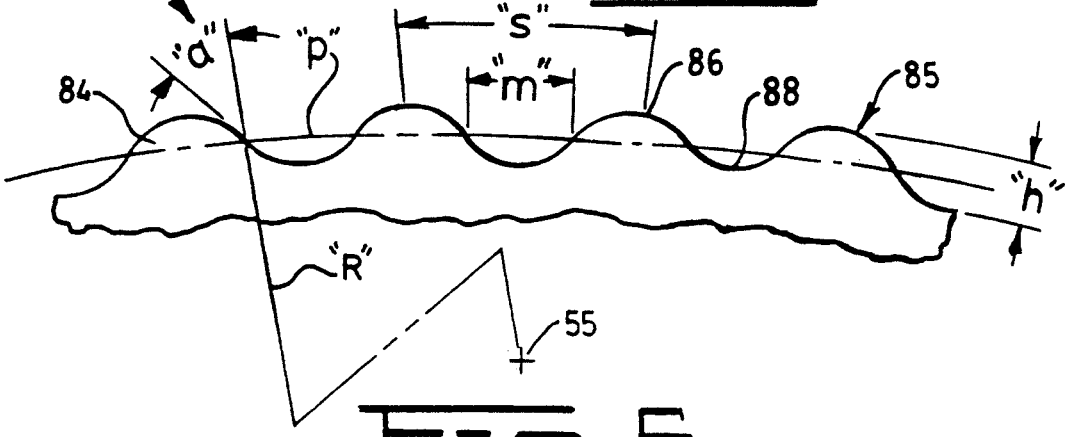
FIG. 5 is a greatly magnified end view of the support ring taken generally along line 5—5 of FIG. 3 to diagrammatically illustrate a preferred embodiment of the splines of the present invention.

Of principle importance to the present invention is means 80 for increasing the torque transfer capacity between the support ring 52 and the load ring 50 along their interface 76. Means 80 comprises a surface texture 82 which is applied to the mating surfaces, i.e., outer surface 64, radial surface 66, and radiused corner surface 68, of the support ring 52. The textured surface 82 is of a configuration sufficient to generate a projected area that is at least 5% of the surface area of a non-textured or substantially smooth surface of equivalent dimensions. Preferably, such projected area is about 12% of the surface area of a smooth surface. As best shown in FIGS. 4 and 5, the surface texture 82 preferably comprises a plurality of uniformly spaced, micro splines 84. As used herein, the term "projected area" refers to a summation of the areas of each individual surface texture element (i.e., spline 84) that each such element would project onto a longitudinal plane (a plane in which the central axis 55 lies) which extends through such element. In the case of splines, the projected area would be an area defined by the length of such spline multiplied by the height thereof. Splines 84 are oriented axially on the cylindrical outer surface 64 and continue around the radius corner surface 68 onto the radial surface 66, where the splines are oriented radially. To optimize the desired torque transfer capacity of the splines 84, it has been found that the splines must have a predetermined profile 85 that falls within certain dimensional and geometric parameters. As best shown in FIG. 5, the profile 85 undulates between peaks 86 and valleys 88. The profile 85 is provided with a peak to peak spacing "s" of less than 2 mm and a peak to valley height "h" of less than 0.5 mm. Preferably, the profile of the splines have a peak to peak spacing of about 0.5 mm and a peak to valley height within a range of from 0.048 to 0.084 mm. The profile of the splines 84 also undulates about a median pitch circle "p" located midway between the peaks and valleys. The profile has a circumferential spacing "m" between adjacent splines at the median pitch circle of between 2.5 to 5.5 times the peak to valley height "h" of such splines. In addition, no portion of the profile is oriented at an angle "a" of less than 25° from a radial line "r" extending through such portion of the profile.

Industrial Applicability

The shear loaded face seal 10 constructed in accordance with the teachings of the present invention advantageously provides the seal with sufficient torque transfer capacity to prevent slippage between the support ring 52 and the load ring 50. In order to prevent such slippage, the torque capacity, or "driving torque", between the load ring 50 and the support ring 52 must always equal or exceed the torque generated between the seal lip 54 and the bushing end face 42 during sealing, referred to herein as the "sealing torque".

In the past, prior seals have relied on friction alone between their support rings having a generally smooth surface and their load rings to generate the driving torque necessary to handle the amount of sealing torque generated. It has been found, however, that the amount of sealing torque varies significantly in use and is dependent on several factors. Such factors include: the amount of face load exerted on the seal lip by the load ring; static and kinetic friction between the seal lip and the end face of the bushing; static adhesion between the seal lip and bushing end face; and inertia. The face load on the seal lip of shear loaded face seals is purposely relatively high, but can vary in use within a normal force range from a minimum unit load of 40 pounds per inch (7 kN/m) of seal lip circumference to a maximum unit load of 80 pounds/inch (14 kN/m). The minimum force is needed to ensure good sealing of the seal lip against the seal face. The amount of face load influences, to a large extent, the other factors noted above.

Independent external factors can also have a significant affect on the amount of sealing torque generated. These external factors may include, but are not intended to be limited to, mud packing around the seal lip between the support ring and the bushing end face and/or freezing of mud or liquid slurry therebetween.

The combination of the factors noted herein generate a substantial and varying amount of sealing torque on the seal lip. This sealing torque is transmitted from the support ring into the load ring through the interface along the mating contacting surfaces therebetween. In order to accomplish this torque without slippage, the driving torque along the interface must equal or exceed the sealing torque, as earlier noted.

The amount of driving torque is also influenced by the amount of face load on the seal, but not by the other factors noted above that affect sealing torque. Additionally, a change in face load has a greater affect on driving torque than on sealing torque, principally due to larger area of contact that the load ring has with the support ring than the seal lip has with the bushing end face. In other words, the amount of friction between the load ring and support ring decreases more rapidly than the amount of friction between the seal lip and the bushing end face per unit of decrease in face load. Another factor that can adversely affect driving torque is the presence of lubricant along the interface between the load ring and the support ring, which reduces the amount of friction between these two components. Under appropriate conditions then, the sealing torque of prior seals can exceed driving torque, resulting in slippage between the load ring and support ring.

The construction of the present invention advantageously overcomes this slippage problem by the incorporation of means 80 for increasing the torque transfer capacity of the seal 10 between the load ring 50 and the support ring 52. Means 80 comprises providing a predetermined surface texture 82 on the mating surfaces 64,66,68 of the support ring 52 substantially along the interface 76 with the load ring 50. The surface texture 82 is of a configuration sufficient to generate a projected area that is at least five per cent, and preferably twelve percent, of the surface area of an non-textured surface, i.e., a substantially smooth surface of the type found on prior support rings, of equivalent dimensions. The increased amount of surface area is effective in increasing the amount of friction between the load ring 50 and the support ring 52.

Preferably, the surface texture 82 is created by means of large number of uniformly spaced micro splines 84 that are oriented normal to the direction of the driving torque. As used herein, the phrase "oriented normal to the direction of the driving torque" means an orientation that is in or generally in the direction of a longitudinal plane in which the central axis 55 of the support ring 52 lies. In other words, the splines are oriented axially if on an axially extending portion of the mating surface, as is the cylindrical surface 64, and oriented radially if on a radially disposed portion of the mating surface, as is the radial surface 66. As described earlier, the splines 84 have a predetermined profile 85 selected to optimize their torque transmission capabilities. The splines 84 not only generate greater friction through an increase in the surface area, as noted above, they also increase torque transfer capacity mechanically by providing a physical locking mechanism. This is accomplished by causing the load ring 50 to deform or work in order for it to slip on the support ring 52. For slippage to occur, not only must friction be overcome, but energy must be expended to deform the load ring 50 over the splines 84, thereby increasing the driving torque capacity. In effect, the load ring 50 develops mating notches to "lock" onto the splines 84. As a result, the driving torque exerts a shearing force on the load ring 50 along the interface 76, again in a direction normal to the driving torque. To accomplish this, the load ring 50 must be sufficiently soft and the profile 85 of the splines 84 must be such to allow the load ring 50 of such hardness to substantially conform to the undulations of the profile 85.

Variations of size, number, shape and spacing of the splines 84 have been investigated to arrive at the parameters described herein that are needed to optimize the torque transfer capacity of the present invention. For instance, it was found that a large number of very small splines 84 performed substantially better than a small number of large splines. While torque capacity is deemed to be proportional to the height of the splines 84, the taller the splines become, the further apart they must be to ensure that the valleys are filled by the load ring 50. In addition, large splines are not desirable because such large splines can unduly stress the rubber of the load ring 50, which may lead to failure of the load ring under the high loads exerted upon it. Likewise, it has been found that the slope of the sides of the spline profile should not be less than 25 degrees from a radial line "r" extending through the slope as depicted in FIG. 5. This side slope greatly facilitates the ability of the load ring 50 to conform to and substantially fully contact the entire profile 85 of the splines 84.

Any suitable manufacturing process may be used to create the splines 84 in the support ring 52. However as the support ring 52 is preferably made by molding, the splines 84 may be economically produced during the molding process of the support ring 52 by chemically etching the mold pattern used to produce the support ring 52.

Figure 6:
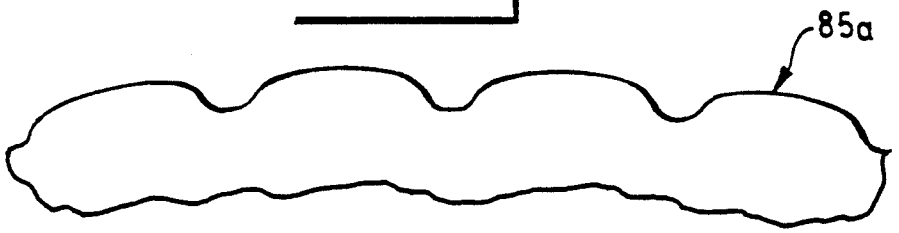
FIG. 6 is a diagrammatic representation similar to FIG. 5, but of an actual trace of the splines constructed in accordance with the present invention.
Figure 7:
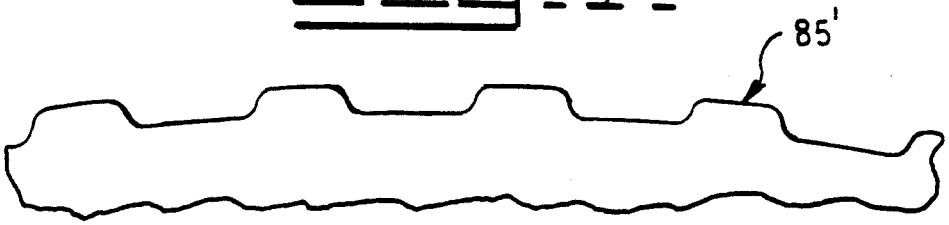
FIGS. 7 and 8 are greatly enlarged profiles of spline geometries, similar to FIG. 5, diagrammatically illustrating acceptable limits that the splines of the present invention may have.
Figure 8:
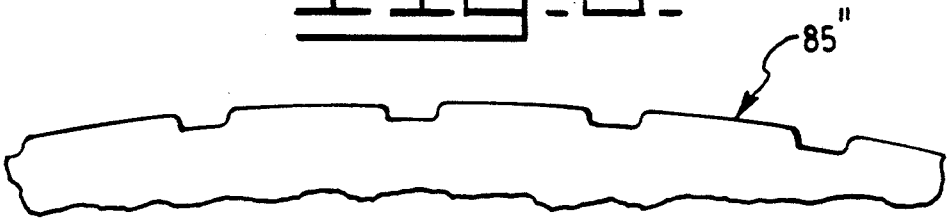

The particular shape of the splines 84 is not critical as any spline shape is satisfactory as long as it falls within the designated limits and the load ring 50 is capable of conforming to the peaks 86 and valleys 88 of the splines 84. The spline profile 85 illustrated in FIG. 5, for instance, diagrammatically illustrates a profile having a sinusoidal wave pattern that falls within the broader desired dimensional and geometric limits set forth herein. The spline profile **85*a* illustrated in FIG. 6 diagrammatically depicts an actual trace made of the splines on an experimental support ring 52 that satisfactorily increased torque capacity by about 150 inch-pounds. FIGS. 7 and 8, on the other hand, diagrammatically illustrate spline profiles 85', 85" having the preferred maximum height and preferred minimum height limits, respectively, set forth herein that would be acceptable for splines produced during the molding process of the support ring 52**, as heretofore discussed.

Other aspects, objects and advantages of the present invention can be obtained from a study of the drawings, the disclosure and the appended claims.

We claim:

1. In a shear loaded face seal having a deformable rubber load ring and a rigid support ring, said load ring and support ring having mating surfaces contacting each other along an interface through which a varying torque is transmitted, the improvement comprising:

means for increasing the torque transfer capacity between the support ring and the load ring along said interface, said means comprising a surface texture on the mating surfaces of said support ring having a configuration sufficient to generate a projected area that is at least five percent of the surface area of a non-textured surface of equivalent dimensions.

2. The shear loaded face seal of claim 1, wherein said load ring has a hardness substantially in a range of from 50 to 70 shore A durometer and said textured surface has a configuration sufficient to allow the load ring of such hardness to substantially conform to the shape of said textured surface.

3. The shear loaded face seal of claim 2, wherein said textured surface comprises a plurality of uniformly spaced micro splines, said splines being oriented normal to the direction of said torque.

4. The shear loaded face seal of claim 3, wherein said splines have a predetermined profile that undulates between peaks and valleys, said profile having a peak to peak spacing of less than 2 mm and a peak to valley height of less than 0.5 mm.

5. The shear loaded face seal of claim 4, wherein the profile of said splines undulates about a median pitch circle between said peaks and valleys and has a circumferential spacing midway between adjacent splines of between 2.5 to 5.5 times the peak to valley height of said splines measured at the median pitch circle.

6. The shear loaded face seal of claim 5, wherein no portion of the profile of said splines is oriented at an angle of less than about 25 degrees from a radial line extending through said portion.

7. The shear loaded face seal of claim 3, wherein the profile of said splines has a peak to peak spacing of about 0.5 mm and a peak to valley height within a range of from 0.048 to 0.084 mm.

8. In a shear loaded face seal having a deformable rubber load ring and a rigid support ring, said load ring and support ring having mating surfaces contacting along an interface through which a varying torque is transmitted, the improvement comprising:

means for providing a surface texture on the mating surfaces of said support ring, said surface texture being of a configuration sufficient to generate a projected area that is at least five percent of the surface area of a non-textured surface.

9. The shear loaded face seal of claim 8, wherein said means includes a plurality of uniformly spaced micro splines, said splines being oriented normal to the direction of said torque.

10. The shear loaded face seal of claim 9, wherein said splines have a circumferential spacing of less than 2 mm and a peak to valley height of less than 0.5 mm.

11. The shear loaded face seal of claim 9, wherein said splines have a circumferential spacing of about 0.5 mm and a peak to valley height within a range of from 0.048 to 0.084 mm.

12. The shear loaded face seal of claim 11 wherein said splines undulate about a median pitch circle between peaks and valleys and have a circumferential spacing between adjacent splines of between 2.5 to 5.5 times the peak to valley height of said splines at the median pitch circle.

13. The shear loaded face seal of claim 12 wherein no portion of said splines is oriented at an angle of less than about 25 degrees from a radial line extending through said portion.

* * * * *